US005491672A

United States Patent [19]

Ferris

[11] Patent Number: 5,491,672

[45] Date of Patent: Feb. 13, 1996

[54] WATCHMAN'S CLOCK SYSTEM

[75] Inventor: Royston Ferris, Norwich, United Kingdom

[73] Assignee: Roster Control Systems, Ltd., Norfolk, United Kingdom

[21] Appl. No.: 356,240

[22] PCT Filed: Apr. 21, 1994

[86] PCT No.: PCT/GB94/00841

§ 371 Date: Dec. 14, 1994

§ 102(e) Date: Dec. 14, 1994

[87] PCT Pub. No.: WO94/25937

PCT Pub. Date: Nov. 10, 1994

[30] Foreign Application Priority Data

Apr. 23, 1993 [GB] United Kingdom .................. 9308426

[51] Int. Cl.[6] .............................. G04B 47/00; G06K 7/10

[52] U.S. Cl. ...................... 368/10; 235/377; 340/825.31; 340/825.55; 340/825.72

[58] Field of Search .............................. 368/1, 9, 10, 47; 235/377, 449, 462, 472, 482, 487; 340/825.52, 825.31

[56] References Cited

U.S. PATENT DOCUMENTS

| | | | |
|---|---|---|---|
| 4,495,496 | 1/1985 | Miller . | |
| 4,688,026 | 8/1987 | Scribner . | |
| 4,801,786 | 1/1989 | Stobbe | 235/377 |
| 5,181,744 | 1/1993 | Betheil . | |

FOREIGN PATENT DOCUMENTS

| | | |
|---|---|---|
| 2161967 | 1/1986 | United Kingdom . |
| 2187317 | 9/1987 | United Kingdom . |

*Primary Examiner*—Vit W. Miska
*Attorney, Agent, or Firm*—Iandiorio & Teska

[57] ABSTRACT

A watchman's clock system comprises a time clock unit capable of interrogating and receiving a coded response from a passive radio frequency responder, typically an identification coded radio frequency tag, located at a site to be visited.

13 Claims, 2 Drawing Sheets

WATCHMAN' S CLOCK SYSTEM

The present invention relates to a time clock system, particularly a watchman's clock system for use in security guarding and similar applications, and to a time clock for use with such a system.

In security guarding duties there is often a need to patrol premises or visit specific locations at periodic intervals, and record in a secure manner that this has been done by the guard allocated to the particular duty.

Traditionally this has been done by providing the guard with a sealed portable time clock having a marking mechanism able to be activated to leave a time of visit record on a card or paper tape within the time clock, using keys located at the places of visit, which engage with the time clock to activate the marking mechanism.

Such a system is open to abuse in a number of ways, for example by the use of covert duplicate keys which may be used to activate the time clock without a visit having been made, and is susceptible to mechanical damage to the key or to the portable time clock itself to render the record keeping facility inoperative.

It is one object of the present invention to provide an improved watchman's clock system in which these disadvantages are overcome.

In its broadest aspect the invention consists in a watchman's clock system comprising a portable time clock capable of reading one or more of a plurality of identification means, each of which may represent and be located at a specific location, without any physical contact between the time clock and the identification means, of recording the identity of each such identification means, and thereby its physical location, and of storing such recorded information therein for subsequent transfer to other equipment.

Preferably the time of visit to each location is recorded concurrently with the identification means identity information.

The identification means is preferably a radio frequency transponder, programmed with an identification code, responsive to a radio frequency interrogation signal from the time clock to transmit a coded radio frequency response for reception by the time clock. The radio frequency transponder may be a passive device powered from the incoming radio frequency interrogation signal, and may be a passive integrated circuit radio frequency tag.

The time clock may include a display, and may be programmed to indicate the order in which and the time at which specific locations are to be visited. The locations may be displayed sequentially, successful interrogation and receipt of identification at one location causing display of the next.

The equipment to which the recorded information from the time clock is transferred may be a computer. The computer may be programmed to check compliance between data representing a route between specific locations received from the time clock, and data representing the originally programmed route.

The time clock includes means for generating dial tone multi-frequency signals, by means of which stored information is transferred from the time clock to the computer via a modem. The dial tone multi-frequency signals may be conveyed to the computer via a telephone line.

The time clock may be provided with a complementary mounting upon which the time clock may be positioned in association with a telephone handset. The complementary mounting may also include a power supply and interconnecting means to enable a battery within the time clock to be charged whilst the time clock is positioned upon the mounting.

A specific embodiment of the invention will now be described by way of example with reference to the accompanying drawings in which.

Figure 1:
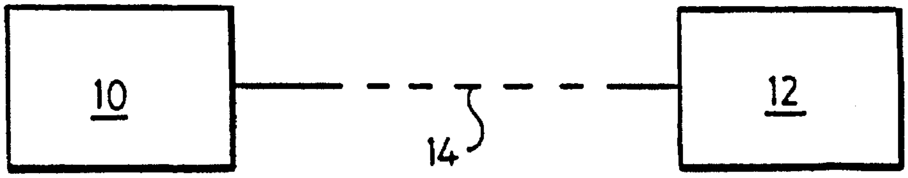
FIG. 1 is a schematic diagram of a watchman's clock system in accordance with the invention.

Referring to FIG. 1, a watchman's clock system in accordance with the invention comprises two principal elements: a portable time clock 10, and an associated computer 12, located at a control centre, either local or remote, incorporating suitable interactive software for scheduling and controlling guard rosters, and for programming the time clock 10. Time clock 10 is coupled temporarily via link 14 to computer 12, for example at the end of a guard duty, for the transfer of stored information to computer 12, and for transfer of information from computer 12 for programming or re-programming of time clock 10, for example for a subsequent duty. If computer 12 is remote, the link may made be through the telephone network or by radio communication from the guard location.

Figure 3:
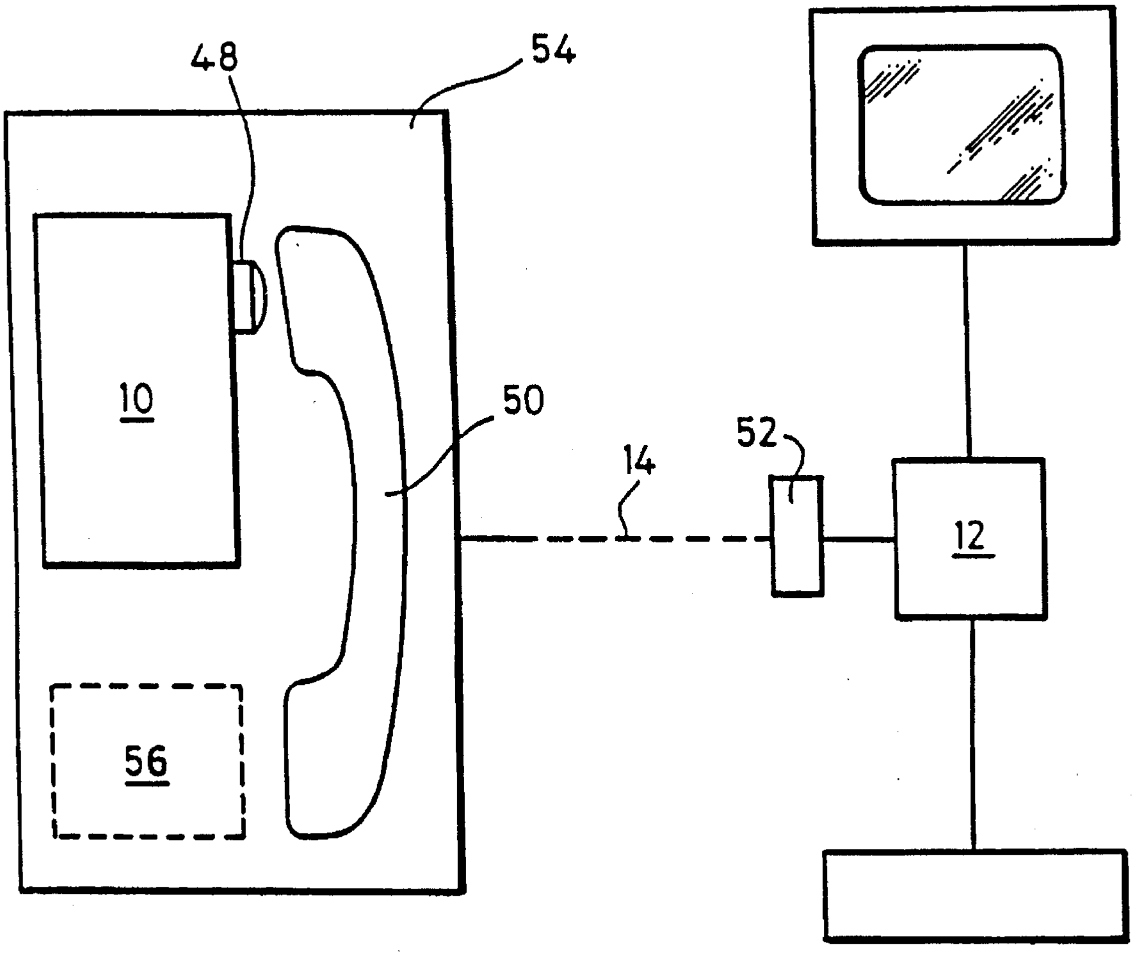
FIG. 3 is a schematic diagram of the time clock of FIG. 2 linked to a computer at a remote control centre.
Figure 2:
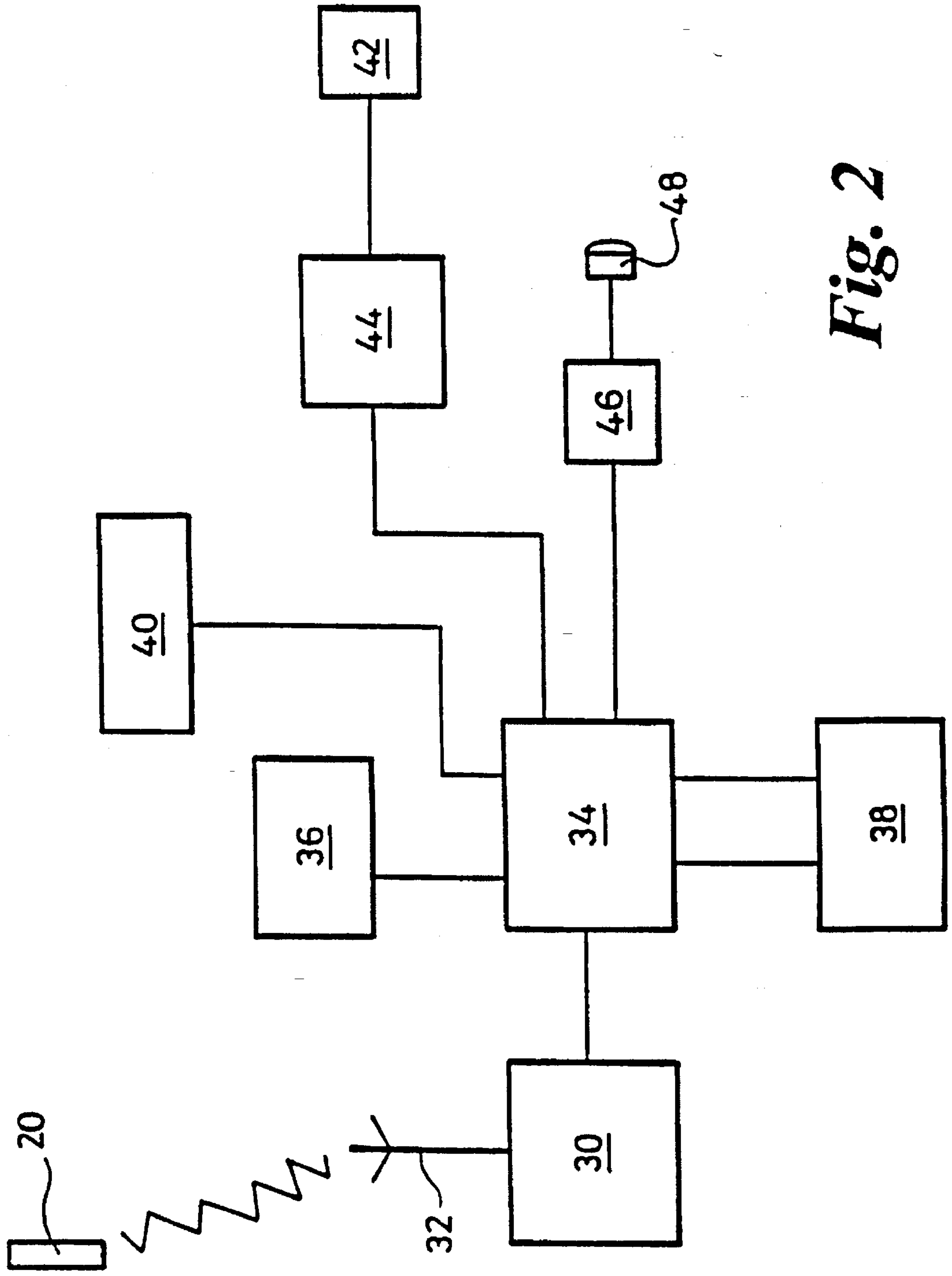
FIG. 2 is a block diagram of the time clock of FIG. 1.

Referring to FIGS. 2 and 3, a radio-frequency ("RF") tag 20, positioned at a location to be visited by a security guard carrying the time clock 10, comprises a passive radio transceiver comprising a tuned coil forming the aerial, and an integrated circuit which controls receive, code and transmit functions of the tag tranceiver.

Such RF tags are commercially available, and parameters such as receive and transmit frequencies, receive sensitivity and transmit range may be specified, as may physical packaging, all appropriate to the application for which the tags are required.

In operation, the such RF tags are activated in known manner by the receipt of a radio-frequency signal of the appropriate frequency, the received signal powering the RF tag to cause it to transmit a response, which, in the present application, is preferably uniquely coded for each tag.

The time clock 10 is a portable, battery-powered unit, comprising an RF tranceiver 30, linked to an aerial 32, able to transmit the appropriate radio frequency signal to RF tag 20, and to receive from the returning identifying coded radio frequency response signal. Following receipt of the coded identifying response signal, RF transceiver 30 delivers a related coded output signal to the digital processing section of the time clock 10, for storage together with related time and date information from clock 36.

The digital processing section of time clock 10 comprises a microprocessor 34, incorporating controlling software in an EPROM memory, a time clock 36, to provide time and date information, a large capacity RAM memory 38 to hold received tag identification codes and related time and date of visit information, and a 32 character display 40 capable of providing operator information and displaying time and date when in use. Display 40 is preferably backlit to enable it to be read when the time clock 10 is in use in the dark.

Time clock 10 is powered by battery 42, under control of a power management unit 44, and is also provided with a dial tone multi-frequency ("DTMF") audio encoder 46 and an audio transducer 48, which, in addition to providing DTMF tones for transmission to the control centre computer 12, either direct or, if remote, via telephone or radio link, can, under the control of microprocessor 34, give audible indication of the successful reading of a tag 20 at each specific location, as well as audible warning of low battery level.

When data stored in time clock 10 representing locations visited in the course of a guard's shift, is to be transferred to the computer 12, at a remote control centre, the audio transducer 48 is placed in proximity to the mouthpiece of a telephone handset 50, and after dialing the remote control centre and receiving a "continue" instruction, either by synthesised speech or otherwise, the transmission of time clock data in the form of coded DTMF tones can be initiated for receipt by the computer 12 at the control centre, for example via modem 52 associated with the computer, into computer 12.

The stored data from time clock 10 may be coded such as to enable successful data transfer to computer 12 to be checked, and an indication from the control centre given at the transmitting end of the link, by synthesised speech or otherwise, of the successful completion of transfer or of the need to re-transmit.

By the use of known data compression techniques stored data representing information from time clock 10 sufficient to cover a full eight-hour shift, may be transferred to the control centre computer 12 in about one minute.

The system described may be provided with a complementary stand or holder 54 to accurately locate telephone handset 50 with its mouthpiece adjacent the audio transducer 48 of time clock 10, for transmitting data from the time clock 10 to the control centre computer 12 by telephone line.

The same stand or holder may be provided with an integral power supply 56 for charging the battery 42 of time clock 10, and means for connecting the two when the time clock 10 is mounted upon the stand or holder.

Transmission of data from computer 12 to the time clock 10 may be achieved by means of a modem, connected to the data processing section of time clock 10 and capable of receiving and converting DTMF tones transmitted from computer 12. The modem (not shown) may be carried by stand 52 and located adjacent the earpiece of telephone handset 50.

One advantage of a system in accordance with the invention is that it enables the identification means specific to each location to be physically concealed at the location without its whereabouts having to be made known, thereby removing the possibility of its duplication or other tampering, and of the possibility of falsification of site visit records.

A further advantage offered by a system in accordance with the invention when used with a computer at a control centre remote from the guard location is that a modem is only necessary at the control centre, and the cost of a transmit modem for each time clock, or at each individual guard location, is removed. By generating DTMF tones at each time clock 10, a modem is required only at the control centre, i.e. the receiving end of the communication link.

This facility enables rapid and immediate transfer of guard duty data to the control centre computer, which when provided with the appropriate software enables the computation of hours worked, payment due, and other personnel and staff-related information, and most importantly enables immediate checks to be made at the end of a duty, of compliance between duty instructions programmed into time clock 10, and the corresponding performed duty data stored during the guard duty and subsequently transferred to the control centre.

In prior art systems information from time clocks has often been collected from each guard location by a supervisor on a periodic visit, by which time much of the time clock data has been of historical interest only, and of little or no use for immediate management purposes.

It will be appreciated that various changes and modifications may be made to the watchman's clock system, and the time clock therefor described with reference to the accompanying drawings, without exceeding the scope of the invention.

I claim:

1. Watchman's clock system comprising a portable time clock capable of interrogating and reading one or more of a plurality of identification means, each of which may represent, and be located at, a specific location, without any physical contact being made between the time clock and such identification means, of recording the identity of each such identification means, and thereby its specific location, and of storing such recorded information therein for subsequent transfer to a computer, in which the time clock comprises means for generating dial tone multi-frequency (DTMF) tones and in which information stored in the time clock is transferred from the time clock to the computer via a modem by means of such tones.

2. A system in accordance with claim 1 in which the information in the form of DTMF tones is conveyed from the time clock to the modem by means of a telephone line.

3. A system in accordance with claim 2 in which the time clock is provided with complementary mounting means upon which the time clock is positioned in association with a telephone handset for transmitting information to the computer through the telephone line.

4. A system in accordance with claim 2 in which the complementary mounting means is also provided with a power supply and interconnecting means to enable batteries within the time clock to be charged whilst the time clock is positioned upon the mounting means.

5. Watchman's clock system comprising a portable time clock capable of interrogating and reading one or more of a plurality of radio frequency transponders, each of which is located at and is programmed with an identification code representing a specific location, and is responsive to a radio frequency interrogation signal from the time clock, to transmit a radio frequency signal including the identification code for reception by the time clock, of recording the identity of each such radio frequency transponder and hence its specific location, and of storing such recorded information therein for subsequent transfer to a computer, in which the time clock comprises means for generating dial tone multi-frequency (DTMF) tones and in which information stored in the time clock is transferred from the time clock to the computer via a modem by means of such tones.

6. A system in accordance with claim 5 in which the information in the form of DTMF tones is conveyed from the time clock to the modem by means of a telephone line.

7. A system in accordance with claim 6 in which the time clock is provided with complementary mounting means upon which the time clock is positioned in association with a telephone handset for transmitting information to the computer through the telephone line.

8. A system in accordance with claim 7 in which the complementary mounting means is also provided with a power supply and interconnecting means to enable batteries within the time clock to be charged whilst the time clock is positioned upon the mounting means.

9. Watchman's clock system comprising a portable time clock capable of interrogating and reading one or more of a plurality of identification means, each of which may represent, and be located at, a specific location, without any physical contact being made between the time clock and such identification means, of recording the identity of each such identification means, and thereby its specific location, and of storing such recorded information therein for subsequent transfer to a computer, in which the time clock comprises means for generating dial tone multi-frequency (DTMF) tones and in which information stored in the time clock is transferred from the time clock to the computer via a modem by means of such tones, the time clock further including means to enable it to be programmed with and display the order in which specific locations are to be visited.

10. A system as claimed in claim 9 in which the specific locations to be visited are displayed sequentially, successful interrogation and receipt of identification at a specific location causing display of the next location.

11. A system in accordance with claim 10 in which the information in the form of DTMF tones is conveyed from the time clock to the modem by means of a telephone line.

12. A system in accordance with claim 11 in which the time clock is provided with complementary mounting means upon which the time clock is positioned in association with a telephone handset for transmitting information to the computer through the telephone line.

13. A system in accordance with claim 12 in which the complementary mounting means is also provided with a power supply and interconnecting means to enable batteries within the time clock to be charged whilst the time clock is positioned upon the mounting means.

* * * * *